Nov. 19, 1929.        I. R. WALKER        1,736,560

CIRCULAR SAW

Filed Jan. 31, 1929

INVENTOR

I. R. Walker

By John R. Tointy

ATT'Y

Patented Nov. 19, 1929

1,736,560

UNITED STATES PATENT OFFICE

IRL R. WALKER, OF SHREVEPORT, LOUISIANA, ASSIGNOR TO R. HOE & CO., INC., OF NEW YORK, N. Y., A CORPORATION OF NEW YORK

CIRCULAR SAW

Application filed January 31, 1929. Serial No. 336,495.

The present invention relates to circular saws of the class used for cutting the blocks from which barrel heads are made and which are generally known as heading saws.

Saws of this class have in the past been made with a uniformly tapering section, relatively thick at the center and thin at the periphery. The side of the saw which is placed against the flange of the saw arbor is usually made flat, and the slope of the taper is entirely on the outer side of the saw, that being the side which runs next to the piece that is cut off.

The theoretical basis for this construction is, that the saw being flat on the side next to the block being cut, causes it to cut straight on that side, and even though the saw is thicker at the center than at the edge, the piece being cut off will spring away sufficiently to give ample clearance for the saw.

It has been found that saws made in this manner show a tendency to be deflected toward the block because the pressure due to cutting, is in a plane close to the flat side of the saw, and there is a lack of support outside of the plane of the thrust.

It is the object of the invention disclosed herein to provide a saw that is formed with a greater thickness in the portion of the plate which is between the axial center and the periphery, whereby the plate is made stiffer and its deflection is prevented.

It is also an object of the invention to provide a saw in which the sides are so tapered that the pressure resulting from cutting will be in a plane which is well within the body of the plate.

With the foregoing and other objects in view, which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit of the invention.

Figure 1:
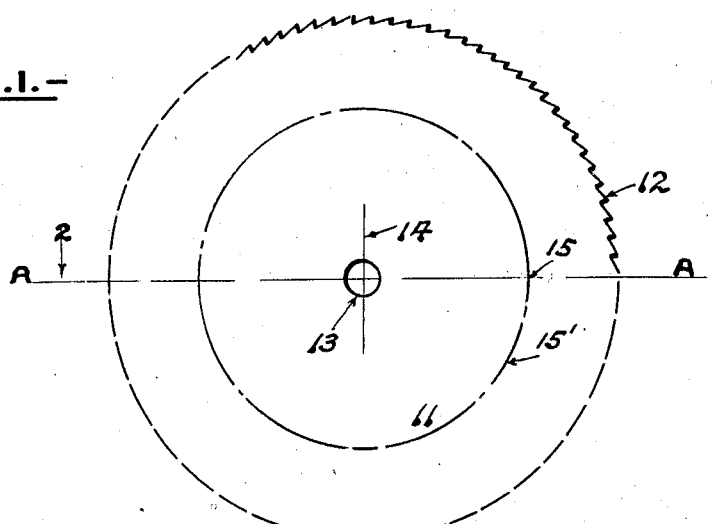
Figure 1 shows a side view of the improved heading saw.

Referring to the drawing; the saw plate is indicated at 11, the teeth at 12, and the center hole at 13. The axis of the saw passes through the center hole and is indicated at 14.

The plate is made thicker near the center than at the periphery and tapering in cross section. The side of the cross section which is the outside of the saw extends in a straight line from the hole 13 to a point close to the periphery of the saw, this being in accordance with common practice. The other side, however, which is the inside of the saw is a broken line, the first portion of which is perpendicular to the axis of the saw and extends from the center hole 13 to a junction point which may be the point 15. The second portion of the line extends from the junction point to a point on the periphery of the saw. Thus the cross section of the plate at the junction point is thickened, and the surface on that side of the plate is divided into two zones, a flat central zone bounded by the circle 15' drawn through the junction point 15, and an outer zone extending from the circle 15' to the periphery and which slopes toward the plane of thrust which lies within the body of the saw and is indicated by the line 16.

In conformity with general practice the teeth 12 are swaged on the cutting edge 17 to a greater width than the thickness of the plate elsewhere on its periphery.

The plane of thrust indicated by the line 16 is perpendicular to the axis of the saw and passes through the center of the teeth.

In the form of saw herein disclosed, the plane of thrust is within the saw plate a greater distance from the inside face of the saw than it would be if the inside face was a flat surface which extended to the periphery. In consequence, the tendency to deflect the saw in operation is lessened. Furthermore, any deflection of the saw that may occur, will cause the thickened portion of the plate to bear against the block being cut and prevent further deflection.

Figure 2:
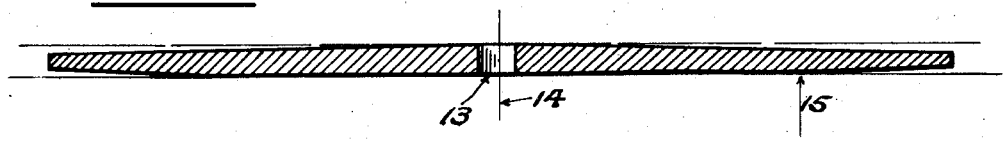
Figure 2 shows a sectional view of the form for the saw plate taken on the line A—A of Figure 1 and viewed in the direction of arrow 2.
Figure 3:
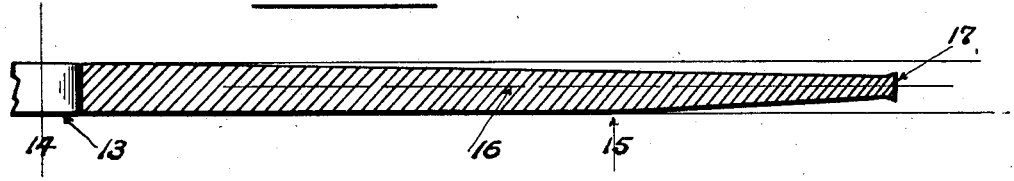
Figure 3 is an enlarged sectional view through a portion of the plate with the dimensions distorted to better show its form.
Figure 4:
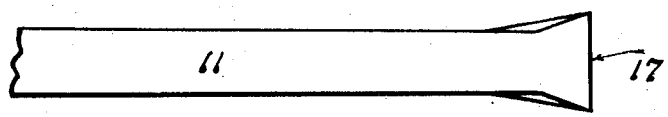
Figure 4 is a greatly enlarged view of a single tooth of the saw showing the shape of the cutting edge and as viewed in the direction of arrow 4 of Figure 5.
Figure 5:
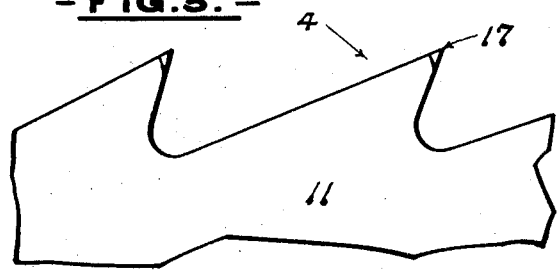
Figure 5 is a greatly enlarged view of a fragment of the periphery of the saw as viewed from one side, showing the shape of a tooth.

It will be understood that the proportions of the saw as shown in Figures 2 and 3 are necessarily distorted in order to explain the invention, and that the location of the junction point 15 can be changed without materially affecting the operation of the saw. Satisfactory operation has resulted when the diameter of the flat zone was made more than one half, and less than three quarters of the diameter of the saw.

What I claim is:

1. A circular saw which has a greater thickness at the center hole than at the periphery, has a surface on one side that slopes throughout its extent, and a surface on the other side that comprises a flat central zone and a sloping outer zone.

2. A circular saw having a surface on one of its sides that slopes throughout its extent, and having a surface on its other side that comprises a flat central zone and an outer zone which slopes from the central zone toward a plane within the body of the saw and perpendicular to its axis.

3. A circular saw, the cross section of which tapers, one side being a straight line extending from a point near the center hole of the saw to a point adjacent the periphery of the saw, and the other side being a broken line, one portion of which is perpendicular to the axis of the saw and extends from a point near its center hole to a junction point that is a greater distance from the axis than one fourth of the diameter of the saw, and the other portion of which extends from the junction point to a point adjacent the periphery of the saw.

4. A circular saw, the cross section of which tapers, one side being a straight line extending from a point near the center hole of the saw to a point adjacent the periphery of the saw and the other side being a broken line, the first portion of which is perpendicular to the axis of the saw and extends from a point near its center hole to a junction point and the second portion of which extends from the junction point to a point adjacent the periphery of the saw, the length of the second portion of the broken line being less than equal to, but greater than one third the length of the first portion.

In testimony whereof, I affix my signature.

IRL R. WALKER.